(12) United States Patent
Tran et al.

(10) Patent No.: US 12,243,049 B2
(45) Date of Patent: Mar. 4, 2025

(54) PAYMENT TRANSACTION PROCESS EMPLOYING DYNAMIC ACCOUNT EXPIRY AND DYNAMIC TOKEN VERIFICATION CODE

(71) Applicant: MASTERCARD INTERNATIONAL INCORPORATED, Purchase, NY (US)

(72) Inventors: Yen Tran, Darien, CT (US); Sandeep Malhotra, Greenwich, CT (US); Mostafa Hussein Sabet, Greenwich, CT (US); Shanthan Subramaniam, Baldwin Place, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 514 days.

(21) Appl. No.: 17/276,995

(22) PCT Filed: Aug. 2, 2019

(86) PCT No.: PCT/US2019/044864
§ 371 (c)(1),
(2) Date: Mar. 17, 2021

(87) PCT Pub. No.: WO2020/060676
PCT Pub. Date: Mar. 26, 2020

(65) Prior Publication Data
US 2022/0036347 A1 Feb. 3, 2022

Related U.S. Application Data

(63) Continuation of application No. 16/138,234, filed on Sep. 21, 2018, now abandoned.

(51) Int. Cl.
*G06Q 20/38* (2012.01)

(52) U.S. Cl.
CPC ..... *G06Q 20/3821* (2013.01); *G06Q 2220/00* (2013.01)

(58) Field of Classification Search
CPC ........................ G06Q 20/3821; G06Q 2220/00
See application file for complete search history.

(56) References Cited

U.S. PATENT DOCUMENTS

| 5,671,279 A | 9/1997 | Elgamal |
| 2014/0061302 A1 | 3/2014 | Hammad |

(Continued)

FOREIGN PATENT DOCUMENTS

WO 2018017068 A1 1/2018

OTHER PUBLICATIONS

"PCT Search Report and Written Opinion", International Searching Authority, dated Nov. 7, 2019 (Nov. 7, 2019), for International Application No. PCT/US2019/044864, 7pgs.

(Continued)

*Primary Examiner* — Raven E Yono
(74) *Attorney, Agent, or Firm* — Buckley, Maschoff & Talwalkar LLC

(57) ABSTRACT

A method includes receiving a request for payment credentials. The request indicates an account from which payment for a transaction is to be made. A payment token is looked-up that corresponds to the indicated account. Dynamic expiry data and a dynamic token verification code are generated. As a response to the request, the looked-up payment token, the generated dynamic expiry data and the generated dynamic token verification code are transmitted.

7 Claims, 6 Drawing Sheets

(56) References Cited

U.S. PATENT DOCUMENTS

| | | |
|---|---|---|
| 2014/0110477 A1 | 4/2014 | Hammad |
| 2014/0310182 A1* | 10/2014 | Cummins .......... G06Q 20/3274 |
| | | 705/72 |
| 2015/0032626 A1* | 1/2015 | Dill ........................... H04L 9/32 |
| | | 705/44 |
| 2015/0032627 A1 | 1/2015 | Dill et al. |
| 2015/0254643 A1 | 9/2015 | Bondesen et al. |
| 2015/0254665 A1 | 9/2015 | Bondesen et al. |
| 2015/0262164 A1 | 9/2015 | Ranganathan et al. |
| 2015/0332626 A1 | 11/2015 | Toyomura |
| 2015/0379515 A1 | 12/2015 | Hammad et al. |
| 2016/0232525 A1* | 8/2016 | Cateland ............ G06Q 20/3223 |
| 2017/0163617 A1* | 6/2017 | Laxminarayanan .. H04L 9/3234 |
| 2017/0200165 A1 | 7/2017 | Laxminarayanan |
| 2017/0255932 A1* | 9/2017 | Aabye .............. G06Q 20/38215 |
| 2017/0373852 A1* | 12/2017 | Cassin ............... G06Q 20/3672 |
| 2018/0006821 A1 | 1/2018 | Kinagi |
| 2018/0075260 A1 | 3/2018 | Moreton et al. |
| 2018/0109508 A1 | 4/2018 | Wall et al. |
| 2019/0108511 A1 | 4/2019 | Dunjic et al. |
| 2019/0318355 A1 | 10/2019 | Chopra et al. |

OTHER PUBLICATIONS

"Supplementary European Search Report", European Patent Office, dated May 22, 2022, for EP Application No. 19863132, 8pgs.
Examination Report No. 1 for Standard Patent Application, issue by the Australian Patent Office, dated Jul. 19, 2024, for Australian Application No. 2019345229, 4pgs.

* cited by examiner

PAYMENT TRANSACTION PROCESS EMPLOYING DYNAMIC ACCOUNT EXPIRY AND DYNAMIC TOKEN VERIFICATION CODE

CROSS-REFERENCE TO RELATED APPLICATION

This application claims the benefit of, and priority to, U.S. patent application Ser. No. 16/138,234 filed on Sep. 21, 2018 and PCT Application No. PCT/US19/044864 which was filed on Aug. 2, 2019. The entire disclosure of the above-referenced application is incorporated herein by reference.

BACKGROUND

FIG. 1 is a block diagram that illustrates a conventional payment system 100.

The system 100 includes a customer device 102 by which a user 103 accesses an e-commerce server 104 via the internet 105. The customer device 102 may be any type of computing device usable to allow access to the internet, and runs a browser program (not separately shown) to enable interaction between the customer device 102 and the various resources available via the internet. The customer device 102 may be, for example, a personal computer, a laptop computer, a tablet computer or a mobile-browser-equipped smartphone or other mobile device. The e-commerce server 104 is typically a server computer operated by or on behalf of a merchant to host an online store/shopping website and to allow virtual visits to the website from customer devices. The e-commerce server 104 also operates to handle online-shopping transactions, typically funded by a payment system account owned by the user 103. In an online shopping transaction, the user 103 operates the customer device 102 to select one or more items for purchase, then elects to enter a checkout phase of the transaction, in which information that identifies the user's payment system account is provided to or accessed by the e-commerce server 104.

A computer 108 operated by an acquirer (acquiring financial institution) is also shown as part of the system 100 in FIG. 1. The acquirer may be a financial institution that provides payment account acceptance services to the merchant that operates the e-commerce server 104. The acquirer computer 108 may operate to receive a transaction authorization request message ("authorization request") for the online shopping transaction from the e-commerce server 104. The acquirer computer 108 may route the authorization request via a payment network 110 (sometimes also referred to as a "card network") to the server computer 112 operated by the issuer of the payment account that was specified during the checkout phase of the online shopping transaction. A transaction authorization response message ("authorization response") generated by the payment account issuer server computer 112 may be routed back to the e-commerce server 104 via the payment network 110 and the acquirer computer 108.

One well known example of a payment network is referred to as the "Banknet" system, and is operated by Mastercard International Incorporated, which is the assignee hereof.

The payment account issuer server computer 112 may be operated by or on behalf of a financial institution ("FI") that issues payment accounts to individual users and/or other entities. For example, the payment account issuer server computer 112 may perform such functions as (a) receiving and responding to requests for authorization of payment account transactions to be charged to payment accounts issued by the FI; (b) engaging in payment transaction clearing operations; and (c) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their e-commerce servers. The system may also include a very large number of payment account holders, who engage in online shopping transactions.

As is well known to those who are skilled in the art, a typical payment system like that shown in FIG. 1 may also handle numerous face to face purchase transactions at the point of sale in retail stores and other establishments. In a typical such transaction (not illustrated), the customer may present a payment card or other payment-enabled device (e.g., a payment-enabled mobile device) to a point of sale (POS) terminal. The POS terminal is operated by the merchant (or merchant's employee) to read payment account information from the card or device presented by the customer. An authorization request may originate from the POS terminal for routing to the account issuer, and the authorization response may be routed back to the POS terminal from the account issuer.

In some e-commerce transactions, the user enters the PAN (primary account number) for his/her payment card account during the checkout phase of interaction between the customer device and the e-commerce server. In other arrangements, there may be a "card-on-file" with the e-commerce server, so that the user does not have to enter his/her PAN. To enhance security, and help to protect the PAN from being intercepted by a wrongdoer, in a card-on-file arrangement the user's payment account may be represented by a payment token, which is a character string that serves as a replacement for the PAN during part of the transaction process. For example, the payment token may be dedicated for use only in e-commerce transactions with the merchant in question.

The present inventors have now recognized an opportunity to further enhance the security and convenience of e-commerce transactions.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, as part of an e-commerce transaction, the user may request a transaction-specific set of payment credentials from a remote payment services computer. In response to the request, the payment services computer may look up a payment token that points to an account that the user has selected to use for the current transaction. The payment services computer may also engage in a cryptographic process or processes to generate dynamic expiry data and a dynamic token verification code. The payment service computer may send the payment token, the dynamic expiry data and the dynamic token verification code to the user as a set of transaction-specific payment credentials. The user may in turn provide the set of payment credentials to the merchant for inclusion in an authorization request and downstream verification of the dynamic expiry data and the dynamic token verification code.

With an arrangement of this kind, the desirable security goal is met of effectively submitting a transaction-specific token that can be verified during payment system processing and that cannot be reused if intercepted by a wrongdoer.

Figure 2:
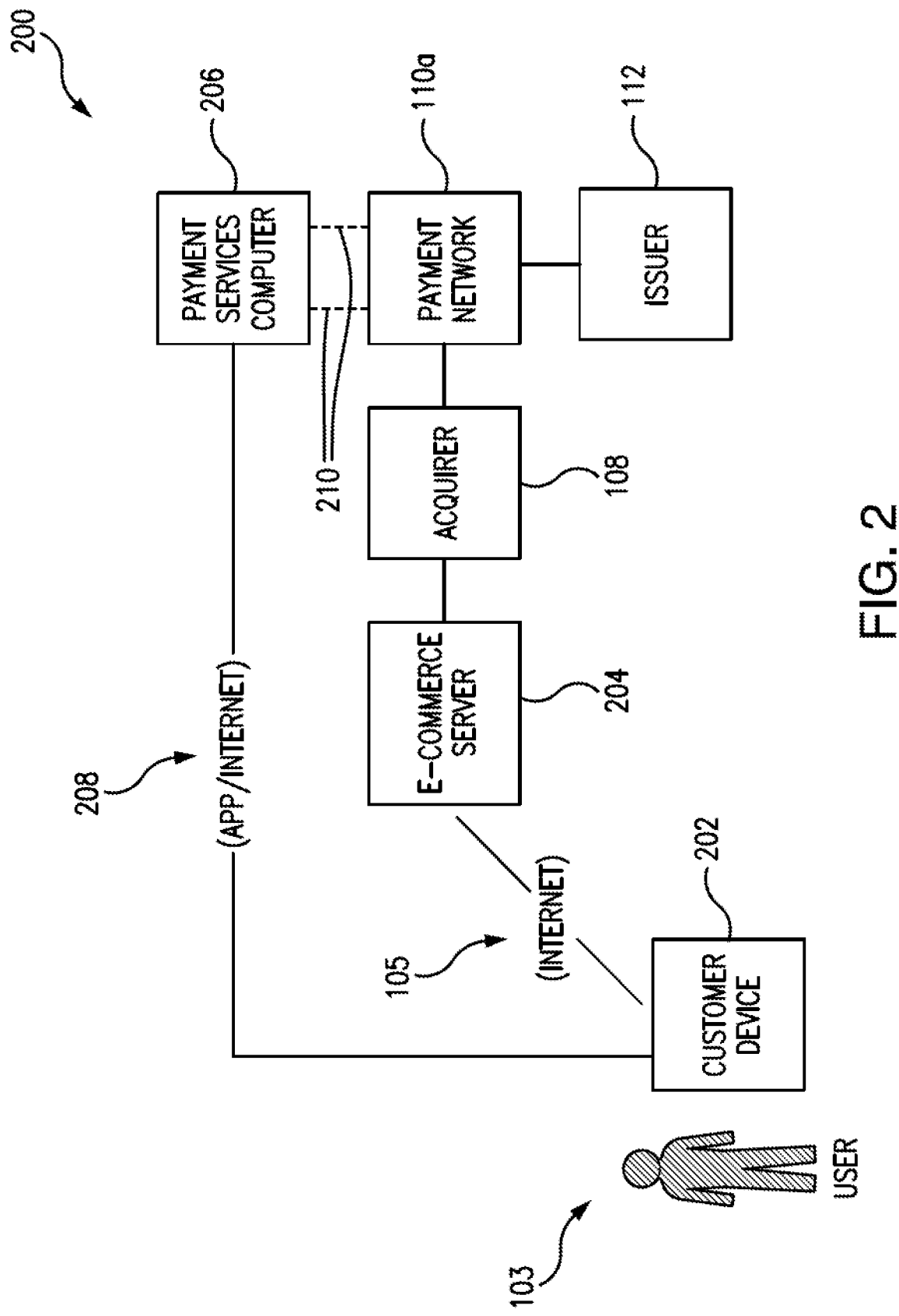
FIG. 2 is a block diagram that illustrates a payment system provided according to aspects of the present disclosure.

FIG. 2 is a block diagram that illustrates a payment system 200 provided according to aspects of the present disclosure.

Figure 1:
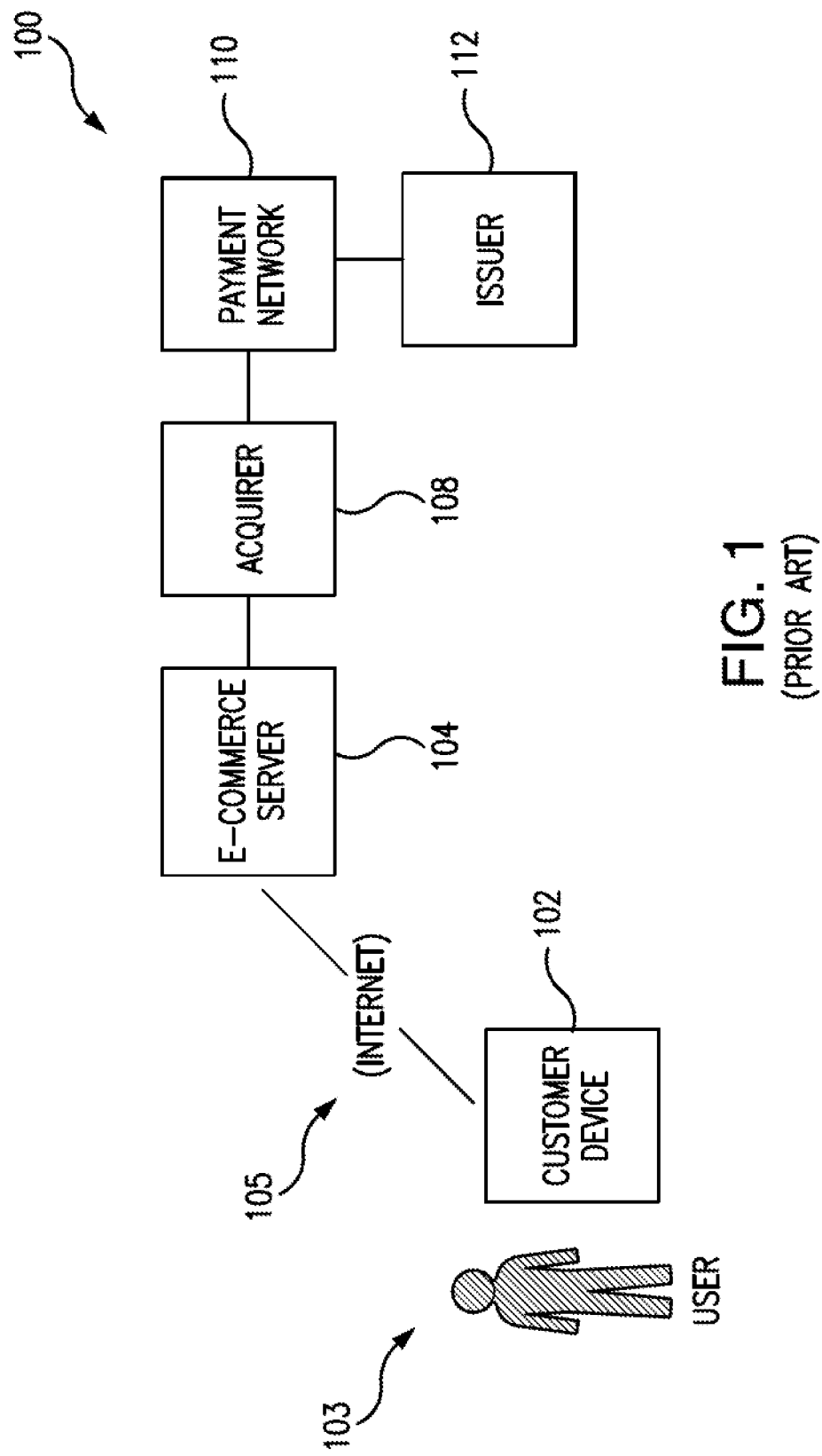
FIG. 1 is a block diagram that illustrates a conventional payment system.

As in the system of FIG. 1, a user 103 is shown operating a customer device 202, so as to interact with an e-commerce server 204 via the internet 105. An acquirer 108 provides the e-commerce server (merchant) 204 with access to a payment network 110a. The system also includes an account issuer 112, to which the merchant's authorization request is ultimately routed via the payment network 110a. In accordance with aspects of the present disclosure, the system 200 further includes a payment services computer 206. Via in-app or internet communication 208, the customer device 202 interacts with the payment services provider 206 to obtain a set of payment credentials, as described herein.

The two dot-dash lines 210 linking the payment services computer 206 to the payment network 110a are intended to imply the possibility or possibilities that (a) the payment services computer 206 is under common operation with the payment network 110a; and/or (b) the payment services computer is closely associated with, in frequent communication with, and/or at least partially overlaps with computing resources employed in operating the payment network 110a.

As was the case with the system as depicted in FIG. 1, FIG. 2 only shows components required for handling a single transaction. In a practical embodiment of the system 200, there may be numerous e-commerce servers, and customer devices, a large number of merchants' banks/acquirers and issuers, and potentially also a number of payment service computers. The system 200 may also handle transactions at the point of sale, and so may include many items of POS equipment like those referred to above. Still further, the system 200 may include a very large number of customer payment devices, such as cards, fobs, payment-enabled mobile devices, etc., for use in initiating transactions at the point of sale.

Figure 3:
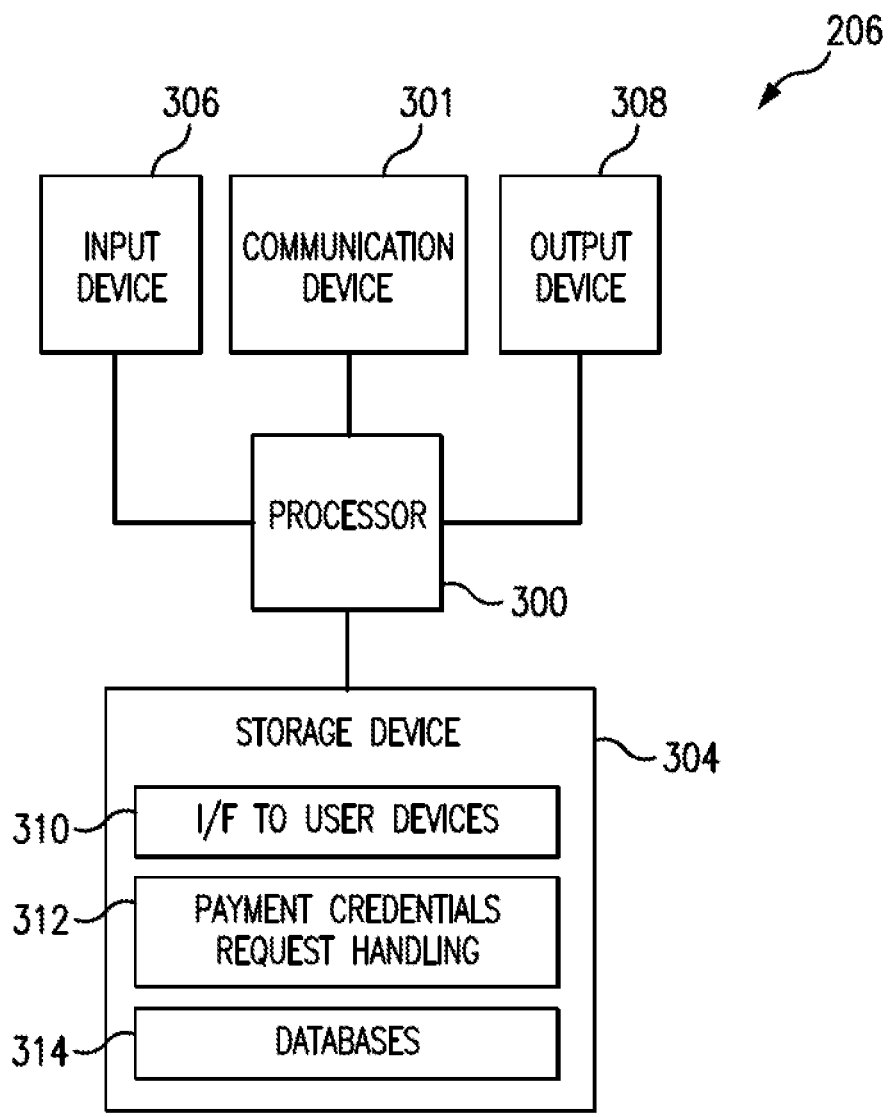
FIG. 3 is a block diagram that illustrates a computer system that may perform a role in the system of FIG. 2.

FIG. 3 is a block diagram that illustrates an embodiment of the payment services computer 206 shown in FIG. 2.

Referring now to FIG. 3, the payment services computer 206 may, in its hardware aspects, resemble a typical server computer and/or mainframe computer, but may be controlled by software to cause it to function as described herein. For example, the payment services computer 206 may be constituted by commercially available server computer hardware and/or by cloud-based computing resources.

The payment services computer 206 may include a computer processor 300 operatively coupled to a communication device 301, a storage device 304, an input device 306 and an output device 308. The communications device 301, the storage device 304, the input device 306 and the output device 308 may all be in communication with the processor 300.

The computer processor 300 may be constituted by one or more conventional processors. Processor 300 operates to execute processor-executable steps, contained in program instructions described below, so as to control the payment services computer 206 to provide desired functionality.

Communication device 301 may be used to facilitate communication with, for example, other devices (such as customer devices). For example, communication device 301 may comprise numerous communication ports (not separately shown), to allow the payment services computer 206 to communicate simultaneously with a large number of other devices, including communications as required to simultaneously handle numerous requests for payment credentials.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the payment services computer 206, executed by the processor 300 to cause the payment services computer 206 to function as described herein.

The programs may include one or more conventional operating systems (not shown) that control the processor 300 so as to manage and coordinate activities and sharing of resources in the payment services computer 206, and to serve as a host for application programs (described below) that run on the payment services computer 206.

The programs stored in the storage device 304 may also include a software communications interface 310 that programs the processor 300 to facilitate communications between the payment services computer 206 and customer/user devices.

The storage device 304 may also store a payment credentials request handling application program 312. The payment credentials request handling application program 312 may program the processor 300 to enable the payment services computer 206 to handle numerous requests for payment credentials as described herein.

The storage device 304 may also store, and the payment services computer 206 may also execute, other programs, which are not shown. For example, such programs may include a reporting application, which may respond to requests from system administrators for reports on the activities performed by the payment services computer 206. The other programs may also include, e.g., database management software, device drivers, etc.

The storage device 304 may also store one or more databases 314 required for operation of the payment services computer 206.

Figure 4:
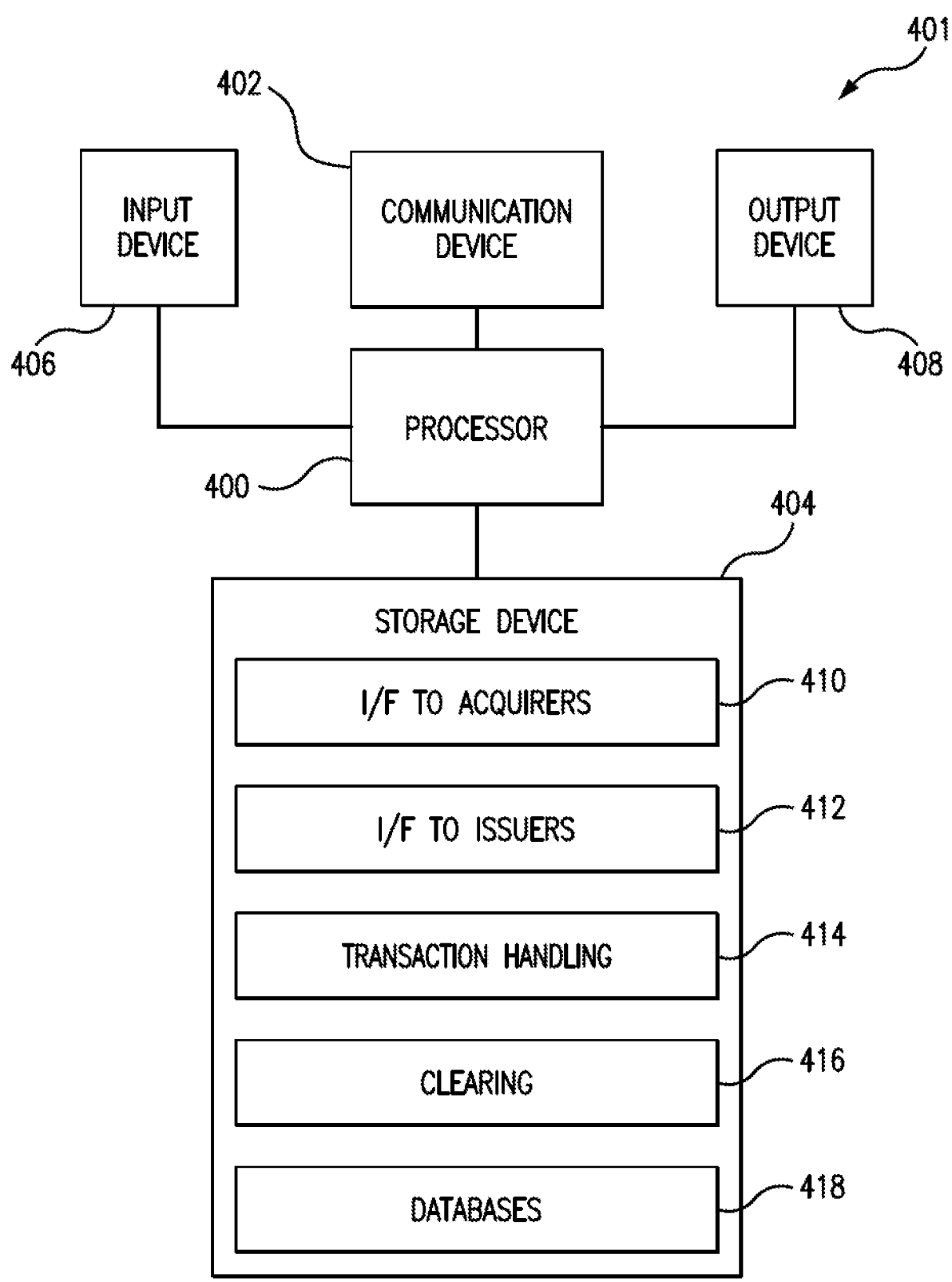
FIG. 4 is a block diagram that illustrates another computer system that may perform a role in the system of FIG. 2.

FIG. 4 is a block diagram that illustrates an embodiment of a computer 401 that performs at least some functionality required for operation of the payment network 110*a*. The computer 401 will accordingly be referred to as the "payment network computer." The payment network computer 401 may resemble the above-described payment services computer 206 in terms of hardware architecture and/or constituent components. Accordingly, the payment network computer 401 may include a computer processor 400 operatively coupled to a communication device 402, a storage device 404, an input device 406 and an output device 408. The communications device 402, the storage device 404, the input device 406 and the output device 408 may all be in communication with the processor 400.

Processor 400 operates to execute processor-executable steps, contained in program instructions described below, so as to control the payment network computer 401 to provide desired functionality.

Storage device 404 stores one or more programs for controlling processor 400. The programs comprise program instructions (which may be referred to as computer readable program code means) that contain processor-executable process steps of the payment network computer 401 executed by the processor 400 to cause the payment network computer 401 to function as described herein.

The programs may include one or more conventional operating systems (not shown) that control the processor 400 so as to manage and coordinate activities and sharing of resources in the payment network computer 401, and to serve as a host for application programs (described below) that run on the payment network computer 401.

The programs stored in the storage device 404 may also include a software communications interface 410 to facilitate data communications between the payment network computer 401 and computers operated by transaction acquirer banks. In addition, the storage device 404 may store a software communications interface 412 to facilitate data communications between the payment network computer 401 and computers operated by account issuer banks.

The storage device 404 may also store a transaction handling application program 414. The transaction handling application program 414 may program the processor 400 to enable the payment network computer 401 to handle numerous payment account system transactions including verification of payment credentials as described below.

Still further, the storage device 404 may store a transaction clearing application program 416. The transaction clearing application program 416 may program the processor 400 to enable the payment network computer 401 to handle clearing of payment account system transactions between issuer and acquirer banks.

The storage device 404 may also store, and the payment network computer 401 may also execute, other programs, which are not shown. For example, such programs may include a reporting application, which may respond to requests from system administrators for reports on the activities performed by the payment network computer 401. The other programs may also include, e.g., database management software, device drivers, etc.

The storage device 404 may also store one or more databases 418 required for operation of the payment network computer 401.

Figure 5:
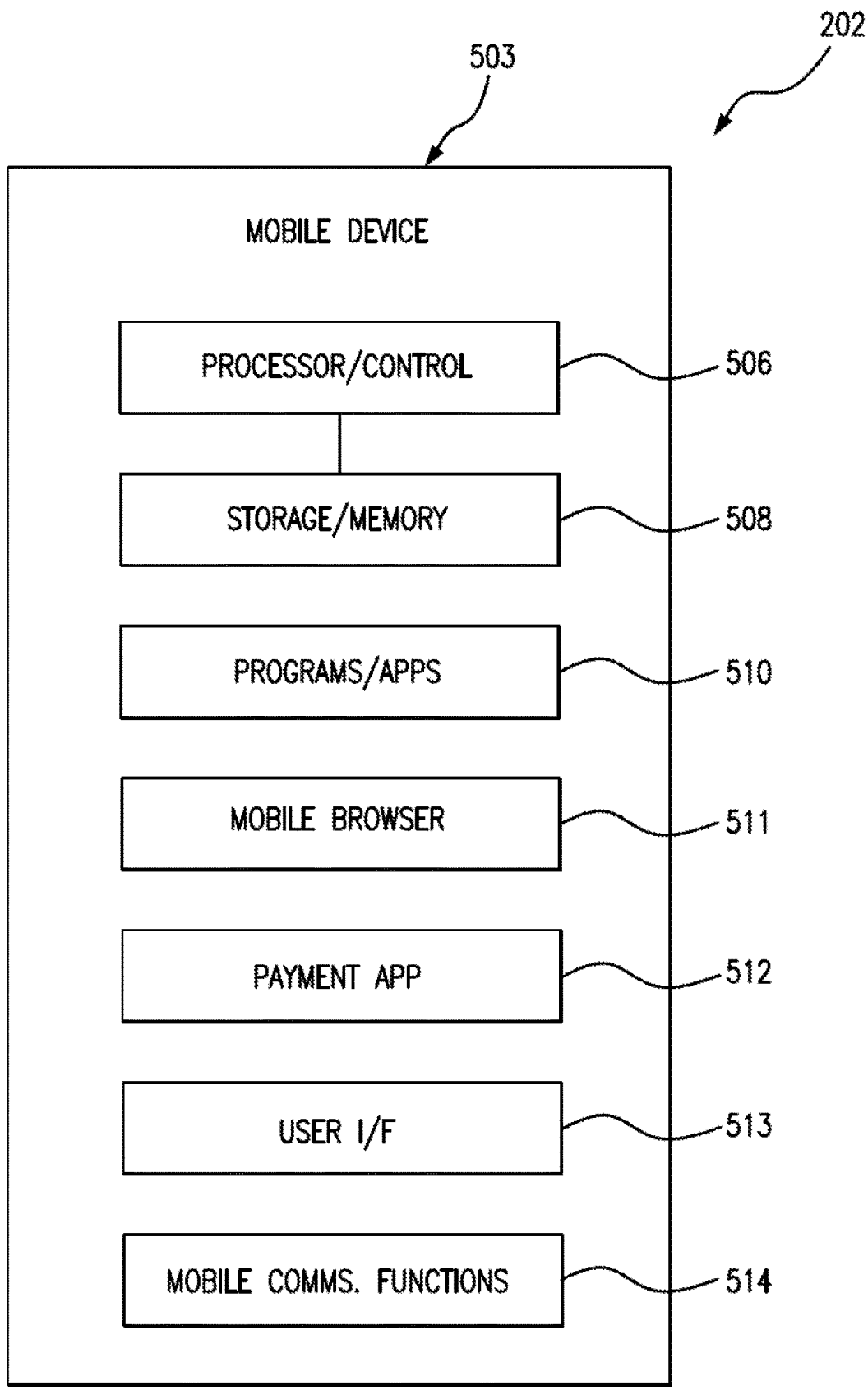
FIG. 5 is a simplified block diagram of a customer device that may perform a role in the system of FIG. 2.

FIG. 5 is a simplified block diagram of an example of the customer device 202 shown in FIG. 2. In this example embodiment, the customer device 202 is illustrated as a mobile device such as a smartphone.

The customer device 202 may include a housing 503. (In cases where the customer device 202 is a desktop computer, the customer device 202 may include several housings including the "tower" housing, the keyboard housing, etc.)

The customer device 202 further includes a processor/control circuit 506, which is contained within the housing 503. Also included in the customer device 202 is a storage/memory device or devices (reference numeral 508). The storage/memory devices 508 are in communication with the processor/control circuit 506 and may contain program instructions to control the processor/control circuit 506 to manage and perform various functions of the customer device 202. Programs/applications (or "apps") that are stored in the storage/memory devices 508 are represented at block 510 in FIG. 5, and may be accessed to program the processor/control circuit 506. In view of its pertinence to the teachings of this disclosure, a browser program is shown separately from the programs/apps 510 and is represented by block 511. In the same vein, a payment app 512 is depicted separately from the other programs/apps 510

Physical and/or software aspects of the device user interface, including input/output (I/O) devices, are represented at block 513 in FIG. 5.

As is typical for computing devices, the customer device 202 may include communications components as represented by block 514. The communications components 514 allow the customer device 202 to engage in data communication with other devices. For example, the communications components 514 may support mobile communications functions that include voice and data communications via a mobile communications network (not shown). The data communication capabilities of the customer device 202 may allow for online browsing sessions and interactions with webpages via the browser 512 and/or may support "in-app" communication sessions.

From the foregoing discussion, it will be appreciated that the blocks depicted in FIG. 5 as components of the customer device 202 may in effect overlap with each other, and/or there may be functional connections among the blocks which are not explicitly shown in the drawing.

Figure 6:
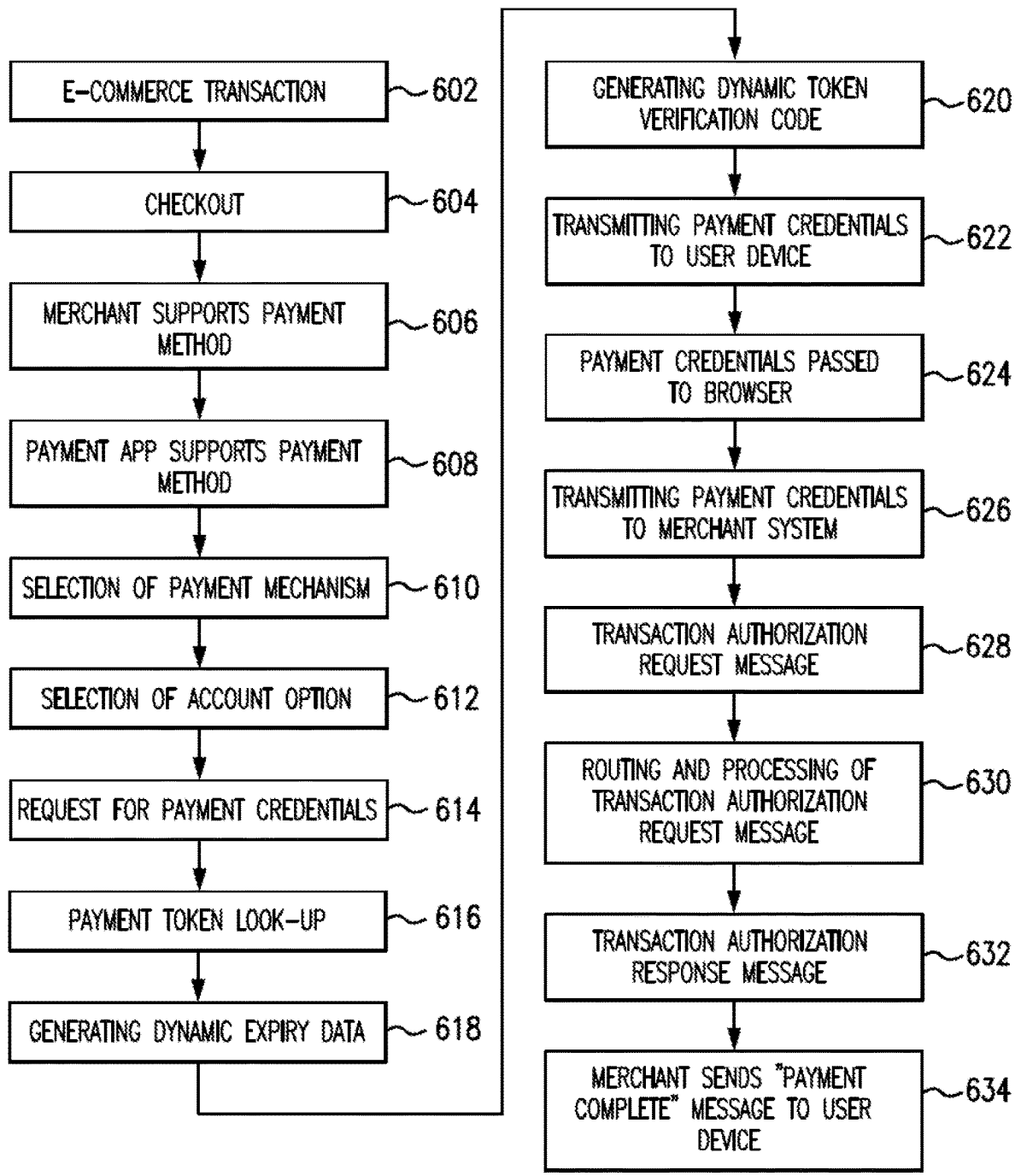
FIG. 6 is a flow chart that illustrates a process that may be performed in the system of FIG. 2 according to aspects of the present disclosure.

FIG. 6 is a flow chart that illustrates a process that may be performed in the payment system 200 according to aspects of the present disclosure.

At 602 in FIG. 6, the user 103 operates his/her customer device 202/browser 512 to engage in an online shopping transaction via interaction between the browser 512 and the e-commerce server computer 204 (FIG. 2). It is assumed that the user 103 selects one or more items for purchase in the transaction, and proceeds to the checkout phase (block 604) of the online shopping transaction.

At 606 in FIG. 6, it is determined that the merchant/e-commerce server 204 supports a payment method, as described below in more detail, in which dynamic expiry data and a dynamic token verification code are coupled with a payment token to form a set of payment credentials. Step 606 may occur via an interaction between the mobile browser 511 (FIG. 5) and the e-commerce server 204.

At 608 in FIG. 6, it is determined that the payment app 512 (FIG. 5) supports the payment method referred to above in connection with step 606. This determination may occur via an interaction between the mobile browser 511 and the payment app.

At 610, the payment app is assumed to be selected by the user from among a number of different payment mechanisms that may be supported by the merchant.

At 612, the user is presented with an opportunity to select from among a number of different accounts belonging to the user, with the selection to indicate which account is to be used for the current transaction. In some embodiments, the accounts available for selection may include a deposit account maintained at a bank and belonging to the user. Other account options available for selection may include credit card accounts, debit card accounts, prepaid card accounts, etc. It is further assumed at 612 that the user selects one of the available account options.

At 614, the customer device 202, via operation of the payment app 512, may interact with the payment services computer 206 so as to transmit to the payment services computer 206 a request for payment credentials. It may be assumed that the payment services computer 206 receives the request for payment credentials. The request for payment credentials may include an indication of the account that the user selected at 612.

At 616, the payment services computer 206 may look up a previously created payment token that has been associated ahead of time with the selected account. As used herein and in the appended claims to "look up" includes the payment services computer 206 accessing a token database that it stores and/or communicating with a token service provider (not shown) to retrieve the result of a mapping between the selected account and a payment token previously assigned to represent the selected account.

At 618, the payment services computer 206 generates dynamic expiry data to be associated for the current transaction with the payment token looked up at 616. The expiry data is "dynamic" in the sense that it is changed from transaction to transaction, rather than being fixed (for a period of a few years) as is the conventional expiration date generally associated with a PAN or payment token.

At 620, the payment services computer 206 generates a dynamic token verification code to be associated for the current transaction with the payment token looked up at 616. The dynamic token verification code is to take the place of a "fixed" code such as a CVC that is customarily associated with a PAN or payment token. The dynamic token verification code is "dynamic" in the sense that it is changed from transaction to transaction, rather than being fixed (for a period of a few years) as is a conventional CVC associated with a PAN.

In some embodiments, the steps 618 and 620 may be accomplished via one or more cryptographic processes performed by the payment services computer 206. The payment token looked up at 616 may be one of the inputs of the cryptographic process or processes. One or more items of transaction data (i.e., data that indicates one or more attributes of the current transaction) may also be an input or inputs of the cryptographic process. Examples of transaction data may include transaction number, transaction amount and/or transaction date and/or time.

According to one example cryptographic process for accomplishing steps 618 and 620, the payment services computer 206 may concatenate the payment token with one, two or more numeric items of transaction data and then may digitally sign the resulting numeric string with a secret cryptographic key. The resulting digital signature is a second numeric string from which the dynamic expiry data and the dynamic token verification code may be derived. For example, the first three digits of the second numeric string may be used as the dynamic token verification code. The next four or more digits of the second numeric string may be subjected to a transformation that produces a four-digit number that satisfies the constraints required to mimic a valid card expiration date. The resulting four-digit number may be employed as the dynamic expiry data. Based on the above description, those who are skilled in the art will recognize that other cryptographic processes may alternatively be used to generate the dynamic expiry data and the dynamic token verification code, using the payment token and one or more items of transaction data as inputs.

Referring again to FIG. 6, at 622, the payment services computer 206 may transmit the payment token looked up at 616, the dynamic expiry data generated at 618 and the dynamic token verification code generated at 620 to the customer device 202 as the requested set of payment credentials. It may be assumed that the result of step 622 is that the payment app 512 in the customer device 202 receives that set of payment credentials.

At 624, the payment app 512 may pass the payment credentials to the mobile browser 511 in the customer device 202. At 626, the mobile browser may control the customer device 202 to transmit the payment credentials to the e-commerce server 204. It may be assumed that the e-commerce server 204 receives the payment credentials transmitted to it at 624.

At 628, the e-commerce server 202 (i.e., the merchant) may assemble a transaction authorization request message (authorization request) in a standard format. The payment token may be inserted in the payment account number field of the authorization request format. The dynamic expiry data may be inserted in the card expiration date field of the authorization request format. The dynamic token verification code may be inserted in the (for example) CVC field in the authorization request format. The authorization request may also include transaction data such as transaction amount and merchant i.d., including the one or more items of transaction data used by the payment services computer 206 to generate the dynamic expiry data and the dynamic token verification code.

Block 630 in FIG. 6 represents routing and processing of the authorization request. This may include routing the authorization request via the acquirer 108 to the payment network 110a. As part of the processing of the authorization request, the payment network computer 401 may detokenize (or obtain detokenization of) the payment token, and also may verify the dynamic expiry data and the dynamic token verification code. The verification processing may include duplicating the process by which the payment services computer 206 generated the dynamic expiry data and the dynamic token verification code using the payment token and transaction data as inputs.

With the PAN or other account number data produced by detokenization, the payment network computer 401 may route the authorization request to the account issuer 112. As forwarded from the payment network computer 401 to the account issuer 112, the authorization request may contain one or more indications that the payment network computer 401 had verified the payment credentials.

At 632, the transaction authorization response message may be generated by the account issuer 112 and routed to the merchant. It may be assumed for purposes of this discussion that the authorization request and the condition of the user's account satisfied the issuer's requirements for approving the transaction, and that the authorization response accordingly indicates approval of the requested transaction.

At 634, the merchant (e-commerce server 204) may send a message to the customer device 202 to indicate that payment processing for the transaction has been completed. Fulfillment of the transaction by the merchant may then proceed in due course.

With a payment process as described herein, a highly secure mode of account identification may be incorporated in an e-commerce transaction. The desirable goal of what is in effect a transaction-specific set of payment credentials is achieved in a manner that is convenient for the user. Although the payment token itself may be reused, the token itself would be of little value to a wrongdoer, if one should intercept it, because the payment token is used only in combination with transaction-specific dynamic expiry data and a dynamic token verification code. The latter two elements of the payment credentials are transaction-specific and are changed for every transaction. Because of the security provided by cryptographic processes, the notional wrongdoer would likely find it impossible to generate valid expiry data and a valid token verification code in order to re-use the token, assuming the same were to be intercepted. Consequently, there is reduced concern over any possible data security breach that might occur with respect to the merchant's systems.

There will now be a further discussion of aspects of the process illustrated in FIG. 6, particularly in regard to transaction authorization and clearing. According to one clearing mode of operation, payment settlement occurs in real time. According to another clearing mode of operation, traditional payment system clearing processes take place.

The traditional clearing mode will be discussed first. In this mode, transaction authorization occurs after the user has engaged in selection of an online purchase and has selected a bank account as the payment instrument. Authorization request processing proceeds from the merchant via the acquirer and the payment network to the account issuer. It will be understood that payment credentials were obtained by the user and provided to the merchant as described above in connection with FIG. 6. As the authorization response is processed at the payment network, the dynamic elements of the payment credentials are verified. Fraud services may also be performed by the payment network, along with detokenization.

Assuming approval of the authorization request, an ACH (automated clearing house) processor (not separately shown) associated with the payment network may enrich the authorization request with payment instruction details (e.g., "from" the user's bank account and "to" the user's bank holding account) and converts the authorization request in ISO 8583 format to ISO 20022 format before sending the authorization request to the user's bank.

The ACH processor converts the authorization response from the user's bank from ISO 20022 to ISO 8583 before sending the authorization response back to the acquirer. The ACH processor also matches the authorized and cleared transactions before sending them to the user's bank.

The ACH processor sends payment instructions to the user's bank to debit the user's bank account and to credit the user's bank holding account. The ACH processor provides clearing and reconciliation files to the user's bank to support clearing and reconciliation. A settlement account management system (not separately shown) sends the settlement advice to a payment network settlement bank (not shown) after reconciling authorization and clearing files. The user's bank settles with the payment network settlement bank, which then settles with the acquirer bank.

The real time clearing mode will next be discussed. In this mode, transaction authorization occurs after the user has engaged in selection of an online purchase and has selected a bank account as the payment instrument. Authorization request processing proceeds from the merchant via the acquirer and the payment network to the account issuer. It will be understood that payment credentials were obtained by the user and provided to the merchant as described above in connection with FIG. 6. As the authorization response is processed at the payment network, the dynamic elements of the payment credentials are verified. Fraud services may also be performed by the payment network, along with detokenization.

Assuming approval of the authorization request, an ACH (automated clearing house) processor (not separately shown) associated with the payment network may enrich the authorization request with payment instruction details (e.g., "from" the user's bank account and "to" the user's bank holding account) and converts the authorization request in ISO 8583 format to ISO 20022 format before sending the authorization request to the user's bank.

The ACH processor converts the authorization response from the user's bank from ISO 20022 to ISO 8583 before sending the authorization response back to the acquirer. The ACH processor also appends the merchant's bank account information to the payment request.

The ACH processor sends the payment request to the user's bank to debit the user's bank account and credit the merchant bank account. The user's bank clears the transaction with a real-time payment bank (not shown), which in turn clears the transaction with the acquirer bank. The user's bank settles with the real-time payments bank, which settles with the acquirer bank.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable, including simultaneous performance of at least some steps and/or omitting one or more steps.

As used herein and in the appended claims, the term "payment card system account" includes a credit card account or a deposit account that the account holder may access using a debit card. The terms "payment card system account" and "payment card account" and "payment system account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the present disclosure has been set forth in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    receiving, by a payment services computer, a request for payment credentials, the request indicating an account from which payment for a transaction involving a user and a merchant is to be made, the request received from a user device;
    looking up, by the payment services computer, a payment token that corresponds to said account;
    generating, by the payment services computer, dynamic expiry data and a dynamic token verification code, the dynamic expiry data indicating an expiration date of the payment token and the dynamic expiry data and dynamic token verification code specifically generated for the transaction such that they are changed from prior transactions;
    responding, by the payment services computer, to the request by transmitting the looked-up payment token, the generated dynamic expiry data and the generated dynamic token verification code to the user device;
    receiving, from a merchant device associated with the merchant, a transaction authorization request message containing the payment token, the dynamic expiry data, and the dynamic token verification code; and
    causing a transaction authorization response message to be transmitted to the merchant device after successful verification of the dynamic expiry data and the dynamic token verification code;
    wherein the generating step includes:
    (a) concatenating the looked up payment token with at least one item of numeric transaction data to form a first numeric string;
    (b) digitally signing the first numeric string with a cryptographic key to form a second numeric string;
    (c) selecting three leading digits of the second numeric string to be the dynamic token verification code; and
    (d) forming the dynamic expiry data by transforming four digits of the second numeric string, said four digits immediately following said three leading digits of the second numeric string.

2. The method of claim 1, wherein said transmitted payment token, dynamic expiry data and dynamic token verification code collectively uniquely correspond to said transaction.

3. The method of claim 1, wherein the payment services computer is operated by an operator of a payment account system.

4. The method of claim 1, wherein the indicated account is a deposit account maintained at a bank.

5. A payment services apparatus comprising:
    a processor; and
    a memory in communication with the processor, the memory storing program instructions, the processor operative with the program instructions to perform functions as follows:
    receiving a request for payment credentials, the request indicating an account from which payment for a transaction is to be made, the transaction involving a user operating a user device and a merchant, the request received from the user device;
    looking up a payment token that corresponds to said account;
    generating dynamic expiry data and a dynamic token verification code, the dynamic expiry data indicating an expiration date of the payment token and the dynamic expiry data and dynamic token verification code specifically generated for the transaction such that they are changed from prior transactions;
    responding to the request by transmitting the looked-up payment token, the generated dynamic expiry data and the generated dynamic token verification code to the user device;
    receiving, from a merchant device associated with the merchant, a transaction authorization request message containing the payment token, the dynamic expiry data, and the dynamic token verification code; and
    causing a transaction authorization response message to be transmitted to the merchant device after successful verification of the dynamic expiry data and the dynamic token verification code;
    wherein the generating step includes:
    (a) concatenating the looked up payment token with at least one item of numeric transaction data to form a first numeric string;
    (b) digitally signing the first numeric string with a cryptographic key to form a second numeric string;
    (c) selecting three leading digits of the second numeric string to be the dynamic token verification code; and
    (d) forming the dynamic expiry data by transforming four digits of the second numeric string, said four digits immediately following said three leading digits of the second numeric string.

6. The apparatus of claim 5, wherein said transmitted payment token, dynamic expiry data and dynamic token verification code collectively uniquely correspond to said transaction.

7. The apparatus of claim 5, wherein the indicated account is a deposit account maintained at a bank.

* * * * *